United States Patent [19]

Reynolds et al.

[11] Patent Number: 4,999,837

[45] Date of Patent: Mar. 12, 1991

[54] PROGRAMMABLE CHANNEL ERROR INJECTION

[75] Inventors: Frank S. Reynolds, Poughkeepsie; Louis W. Ricci, Hyde Park, both of N.Y.

[73] Assignee: International Business Machines Corporation, Armonk, N.Y.

[21] Appl. No.: 325,417

[22] Filed: Mar. 20, 1989

[51] Int. Cl.$^5$ .............................................. G06F 11/00
[52] U.S. Cl. ........................................ 371/3; 371/7; 371/16.5
[58] Field of Search ................ 371/3, 23, 17, 18, 16.5, 371/29.1, 15.1, 16.1, 27, 7; 364/200 MS File, 900 MS File

[56] References Cited

U.S. PATENT DOCUMENTS

| | | | |
|---|---|---|---|
| 4,149,038 | 4/1979 | Pitroda et al. | 179/15 |
| 4,393,490 | 7/1983 | Culley | 370/13 |
| 4,503,535 | 3/1985 | Budde | 371/29.1 X |
| 4,669,081 | 5/1987 | Mathewes | 371/3 |
| 4,719,626 | 1/1988 | Ogasawara | 371/16 |
| 4,759,019 | 7/1988 | Bently et al. | 371/3 |
| 4,779,271 | 10/1988 | Suzuki | 371/3 |
| 4,794,599 | 12/1988 | Purcell et al. | 371/20 |
| 4,796,258 | 1/1989 | Boyce et al. | 371/16 |
| 4,799,220 | 1/1989 | Nielsen | 371/25 |
| 4,819,235 | 4/1989 | Kelly | 371/29.1 X |
| 4,835,459 | 5/1989 | Hamlin | 371/3 X |

OTHER PUBLICATIONS

IBM TDB, vol. 17, No. 6, Nov. 1974, pp. 1691-1692, by D. C. East et al., "Error Injector for Testing a Data Processing Unit".
IBM TDB, vol. 24, No. 5, Oct. 1981, p. 2339, by E. J. Cerul et al., "Synchronized Error Injection".
IBM TDB, No. 20, vol. 8, Jan. 1978, p. 3286, by J. N. Gaulrapp et al., "Error Injection Tool".
R. Cormier, "Computer Fault Generator", IBM TDB, vol. 11, No. 8, 1/1969, pp. 924-926.
K. Kadner, "Microprogram Testing of Error-Correction Logic", IBM TDB, vol. 15, No. 3, 8/1972, pp. 852-854.
"Programmable Error Injection with Interface Selection", IBM TDB, vol. 29, No. 2, Jul./1986, pp. 539-541.
D. Crandall, "Error Generator for I/O Device Attachment", IBM TDB, vol. 25, No. 6, 11/1982, pp. 3045-3049.

Primary Examiner—Jerry Smith
Assistant Examiner—Robert W. Beausoliel
Attorney, Agent, or Firm—Floyd A. Gonzalez

[57] ABSTRACT

An error injection tool for injecting errors into a computer channel wherein the error injection is under microcode control in the channel itself. Error injection may be random or precise, based upon inputted parameters. The injection can be either immediate or delayed, as desired. The resulting error injection may be layered such that an event may be set up to trigger a later error injection, with the layered error injection occurring in the true running environment of the channel. A time of day log may be constructed for timing the exact initiation and recovery time of an error.

22 Claims, 6 Drawing Sheets

PROGRAMMABLE CHANNEL ERROR INJECTION

BACKGROUND OF THE INVENTION

The present invention relates to error injection methods and apparatus used in the testing of electronic data processing systems, and more particularly relates to the injection of errors into a channel of an electronic data processing system and means to time the recovery of the system from the injected error.

As electronic data processing machines have become more sophisticated, tools and techniques for testing these data processing machines have become more sophisticated. Typically, testing tools have been external devices which depended upon stimuli such as electrical signals for indicating the state of the machine or portion of the machine being tested. Faults or errors are then injected in response to the stimuli to test machine's reaction to a fault in that particular state.

D. G. East et al., Error Injector for Testing a Data Processing Unit, IBM Technical Discl. Bulletin, vol. 17 no. 6, Nov. 1974, pp. 1691–1692, discloses a tool for injecting errors in which the unit under test produces a multibit signal which identifies the particular operations of the unit during the test. The multibit signal is compared by match logic which includes a set of manual switches to determine when an error is to be injected. The injector includes circuitry to delay the error injection for a set count after the multibit signal is matched, and circuitry to stop the error pulses after a preset count.

J. N. Gaulrapp et al., Error Injection Tool, IBM Technical Discl. Bulletin, vol. 20 no. 8, Jan. 1978, p. 3286, discloses an error injection tool for injecting error pulses into circuitry to test hardware and software error recovery. The disclosed tool includes a trigger circuit, which, when triggered, injects an error into a circuit under test after a user set number of counts have been received by a counter. The width of the injected error may also be set by a width counter.

E. J. Cerul et al., Synchronized Error Injection, IBM Technical Discl. Bulletin, vol. 24 no. 5, Oct. 1981, p 2331, discloses a reloadable control store in the director to establish error states in synchronism with central processor execution of an I/O related function. The reloadable control store contains control word microprograms for operating the director and may be loaded with a special control word for initiating a synchronized error injection mode of operation in the director.

U.S. Pat. No. 4,149,038 to Pitroda et al. for Method and Apparatus for Fault Detection and PCM Multiplexed System Apr. 10, 1979, and U.S. Pat. No. 4,393,490 to Culley for Digital Telecommunications Switches Network with In-Built Fault Identification issued Jul. 12, 1983. Both of these patents disclose telecommunications networks into which parity errors or error patterns are deliberately injected to find faults.

U.S. Pat. No. 4,719,626 to Ogasawara for Diagnostic Method and Apparatus for Channel Control Apparatus issued Jan. 12, 1988 and discloses a data processing system in which errors are sent to a pseudo-input/output control unit to test the common bus interface of a channel control. External errors are injected from an outside source into the functional channel unit to provide data for diagnostic purposes.

U.S. Pat. No. 6,759,019 to Bently et al. for Programmable Fault Injection Tool issued Jul. 19, 1988 and discloses an external tool for injecting faults into a system under test in response to sensed external hardware events to determine the state of the system under test. The disclosed tool includes a user interface to give parameters to a microprocessor which can be programmed to control tests of a system wherein the test is responsive to the sensed state of the system.

U.S. Pat. No. 4,779,271 to Suzuki for Forced Error Generating Circuit for a Data Processing Unit issued Oct. 18, 1988 and discloses an external circuit for generating errors for a data processing unit responsive to a signal for starting a period for causing the error and a forced error generating instruction.

SUMMARY OF THE INVENTION

The present invention provides means internal to a channel under test for injecting errors into the channel under test. The state of the channel under test is determined by microcode and software control bits without actually attaching hardware connections to the channel. Every time interval during the running of the channel is represented by one of a plurality of microcode words. These microcode words are used for driving the hardware and are constantly updating control bits, arrays, or registers to reflect the actual hardware state of the channel. Based on these states, the microcode will react to drive the hardware and the function. The microcode words can be represented by a series of addresses, one address for every time cycle in the system under test. Based on conditions which occur in the system, either the next address or a branch address is used. Groups of addresses thus represent a particular function which the hardware executes.

Using microcode address compare logic, the user at a console can set up any microcode address, or any time cycle, to invoke an error inject microcode. Once the error inject microcode is invoked, a layered error inject process can begin, all under software microcode control using the software control bits and array bits, giving full access to all hardware functions of the channel under test without the need for hardwired external connections. Thus, the channel's own microcode can alter the software control bits used by its functional code and, by using the error inject of the microcode or of hardware, allows an unlimited number of states of the test channel to invoke a test. A test might be initiated when an error is injected at the time the error injection microcode is invoked, or a future error may by injected at a new microcode address after control is returned to the functional microcode. The function of the software control bits can be changed with the predictable state of the channel under test, causing the normal functional microcode to get mixed up, or the address compare register can be reset to invoke the error inject microcode at a different time and with a new parameter list later in the functional code. The microcode of the system under test can be instructed to recover, and the microcode can be reinitiated as desired. Thus, the error inject microcode can cause one or more layers of error injection definition to be established. The dynamic interaction of the error inject microcode and the functional microcode creates a series of layers of instructions for defining when an error is to be injected. It will thus be understood that the error injection tool of the present invention may be programmed to simulate the effects of and recovery from a random error, such as an alpha particle, which changes a single bit in memory.

It is thus an object of the present invention to provide an error injection tool which is internal to the channel under test.

It is another object of the invention to provide an error injection tool which provides for layers of instructions for defining when an error is to be injected into a channel under test.

It is another object of the invention to provide direct interaction between a user and an error injection tool in defining when an error is to be injected into a channel under test.

It is another object of the invention to provide an accurate means for dynamically measuring the time it takes a channel under test to recover from an injected error.

The foregoing and other objects, features and advantages of the invention will be apparent from the following more particular description of the preferred embodiment of the invention as illustrated in the drawings.

DESCRIPTION OF THE PREFERRED EMBODIMENT

Figure 1:
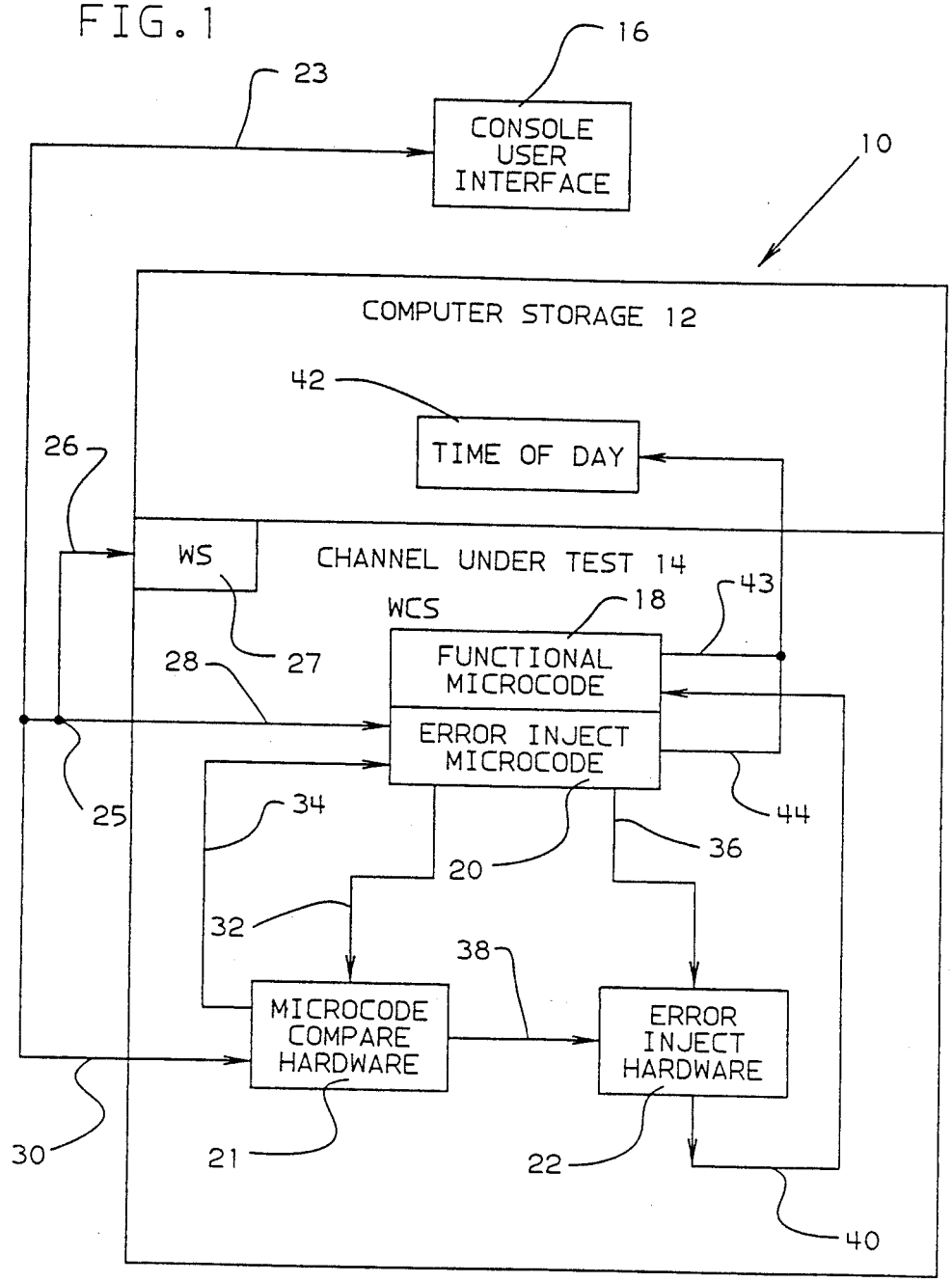
FIG. 1 is a block diagram of a channel under test containing the error injection tool of the present invention.

FIG. 1 shows a portion of a data processing system 10 which includes computer storage 12, an input/output channel 14 to be under test, and a console user interface 16. The channel under test 14 may be any one of the plurality of channels present in a general purpose computer such as an IBM System/370 computer as discussed in IBM System/370 Extended Architecture Principles of Operation, Publication Number SA22-7085-1, available from IBM Corp. Each channel, such as channel under test 14, includes its own writeable control storage (WCS) in which is held functional microcode 18. As is known, each channel has its own microprocessor (not shown) for executing the microcode in its WCS, thereby operating the channel 14. As will be understood, the functional microcode 18 includes software control bits, arrays and registers (not shown) which define and control the state of the channel 14. Even though the disclosed example is for a channel of a data processing system, the error injection tool of the present invention may be used in any apparatus having a separate microcode processor.

The error inject tool of the present invention includes error inject microcode 20 in the WCS of the channel 14, microcode compare hardware 21, and error inject hardware 22. The console user interface 16 includes a bus 23 over which data or commands may be dynamically sent to the error inject tool. A logic node 25 separates data from commands such that data may be sent over path 26 to parameter lists in the working storage 27 (WS) of the channel 14, and commands over path 28 to the error inject microcode 20. Certain data may also be sent over path 30 to the microcode compare hardware 21 to define error injection events, as will be explained. The microcode compare hardware 21 may receive certain data to invoke error injection events from the error inject microcode 20 over path 32, and interrupt signals may be sent by the microcode compare hardware 21 to the error inject microcode 20 via conductor 34. Error type data may be sent from the error inject microcode 20 over path 36 to the error inject hardware 22, and error inject signals may be sent from the microcode compare hardware 21 to the error inject hardware 22 via conductor 38, as will be discussed. Control, as shown by line 40, is provided to return control back to the functional microcode 18 after an error event has been invoked by the error inject hardware 22. As is well understood, a time of day register 42 is kept in the computer storage 12, and is maintained by the computer system 10 and accessible for determining the time of day when accessed.

As shown by lines 43 and 44, the time of day register 42 may be interrogated by either the functional microcode 18 or the error inject microcode 20, respectively, such that a time of day log may be constructed in either the computer storage 12 or the working storage 27, as desired, to accurately time the occurrence and duration of error injection and recovery, as will be explained.

Figure 2:
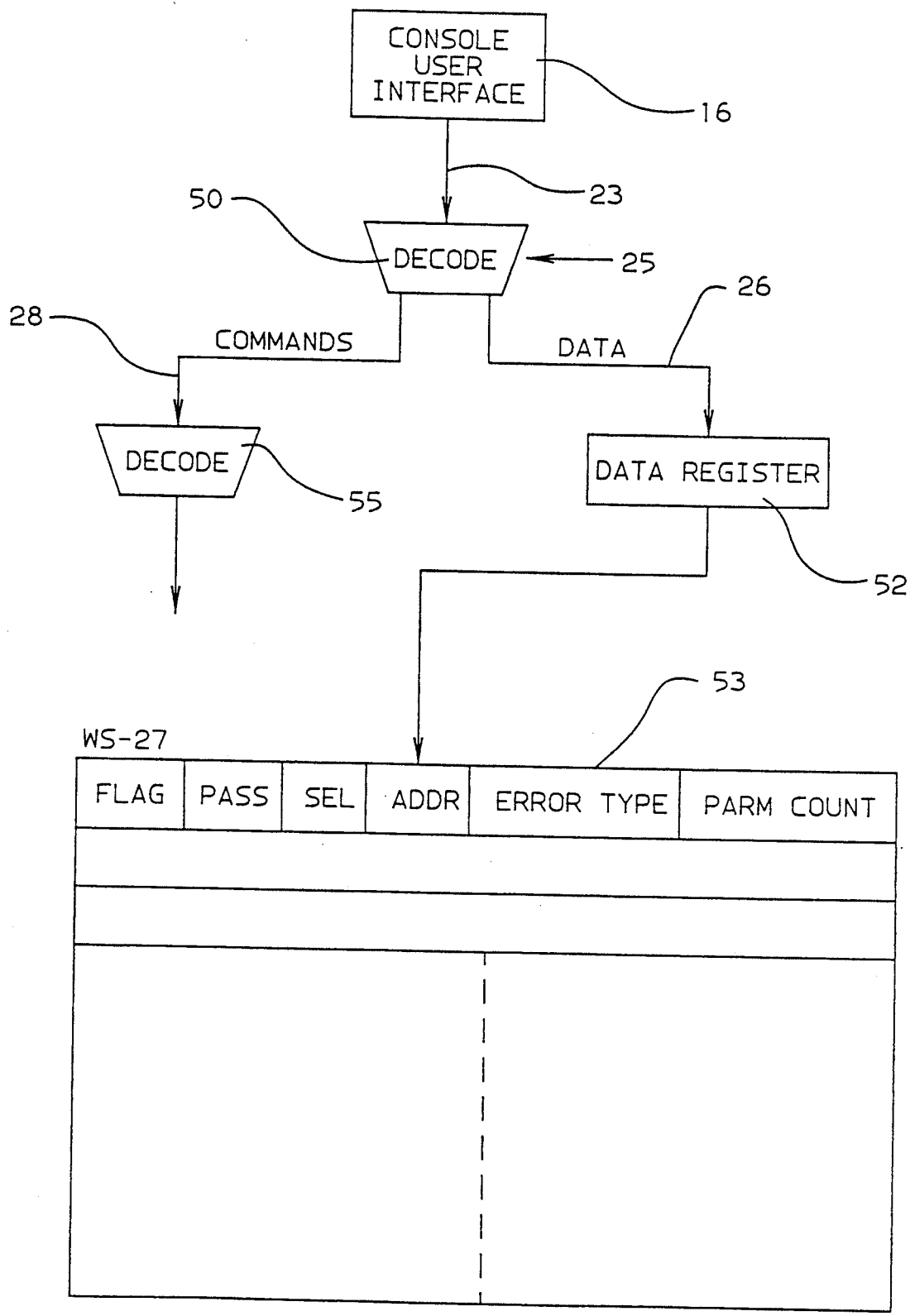
FIG. 2 is a diagram of an input connection between a console user interface and the error injection tool of FIG. 1.

FIG. 2 is a diagram showing the input of parameter list data and commands from the console user interface 16 to the error injection tool of the present invention. As will be explained further, parameter lists may be used to provide information to the error injection tool as to when and what type of errors will be injected. As discussed in connection with FIG. 1, the console user interface 16 is connected by bus 23 to a logic node 25 shown in FIG. 2 as a decode function 50, which provides commands to line 28 and data to line 26. The data goes over line 26 to a data register 52, from which the data is placed into working storage 27 in parameter list entries 53. Each parameter list entry includes a flag (FLAG) which is used to determine when data is added to and removed from the parameter list, as is well understood, a pass specification (PASS) entry designating how many passes the microcode is to make using this entry before going on to the next entry, a select (SEL) entry for use in a selection process to be described, an address (ADDR) entry to be used to designate the address of the functional microcode where an error inject event is to be invoked, an error type (ERROR TYPE) entry to designate the type of error to be injected and a parameter count (PARM COUNT) entry to be used in certain delayed error injection cases as will be explained.

Commands on line 28 are decoded by a decoder 55, and are used to interrupt the microcode in the WCS to allow the microcode to fetch the parameter list data in the data register 52 and store it in working storage 27. Although the logic node 25 and paths 26 and 28 are shown as external to the error inject microcode 20 for ease of illustration, it will be understood that the data fetching functions they represent could be part of either the functional microcode 18 or the error inject microcode in the WCS, as desired.

Figure 3A:
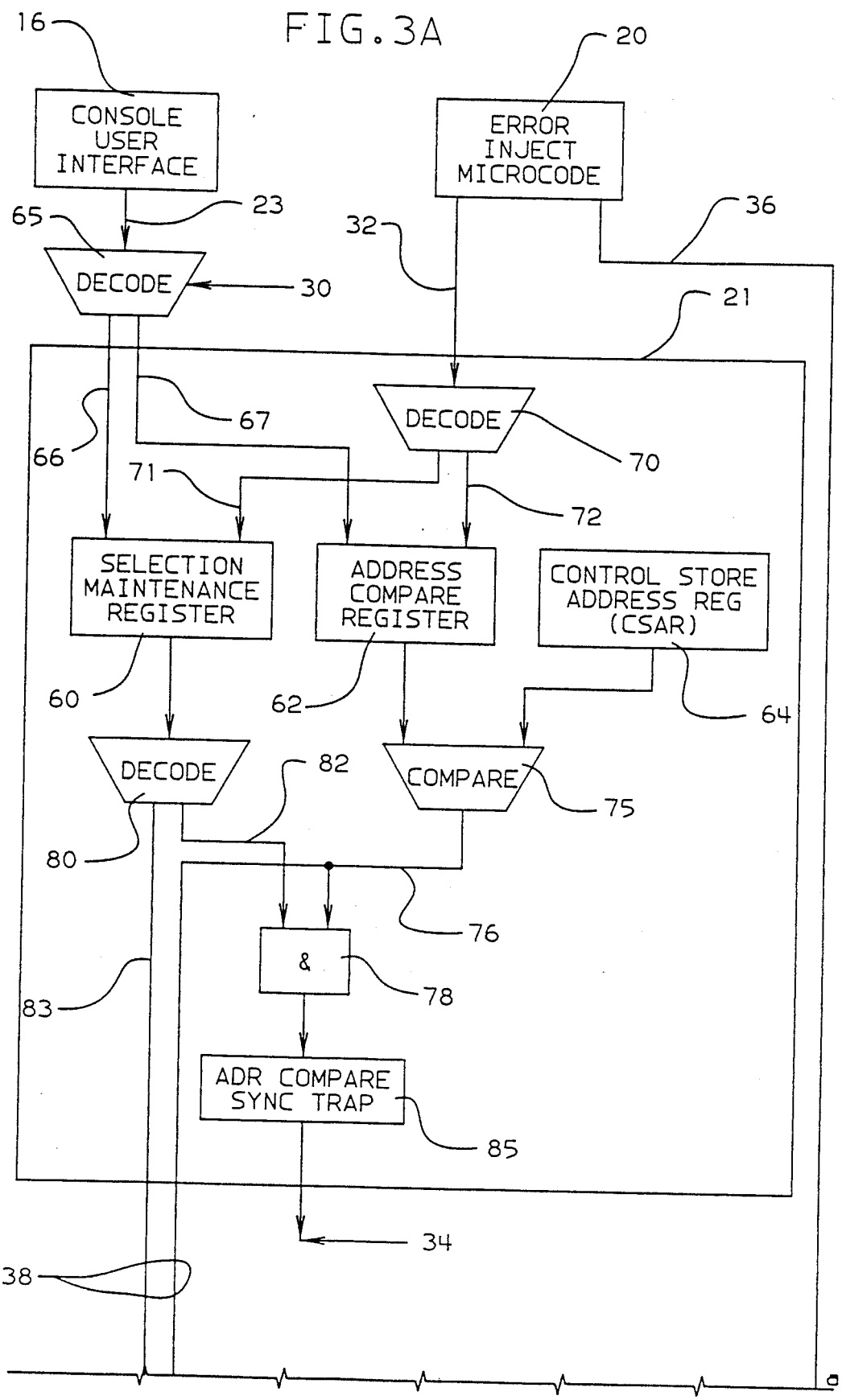
FIGS. 3A and 3B, joined along line a—a, form a block diagram showing the components and interconnection of the hardware of the error injection tool of FIG. 1.
Figure 3B:
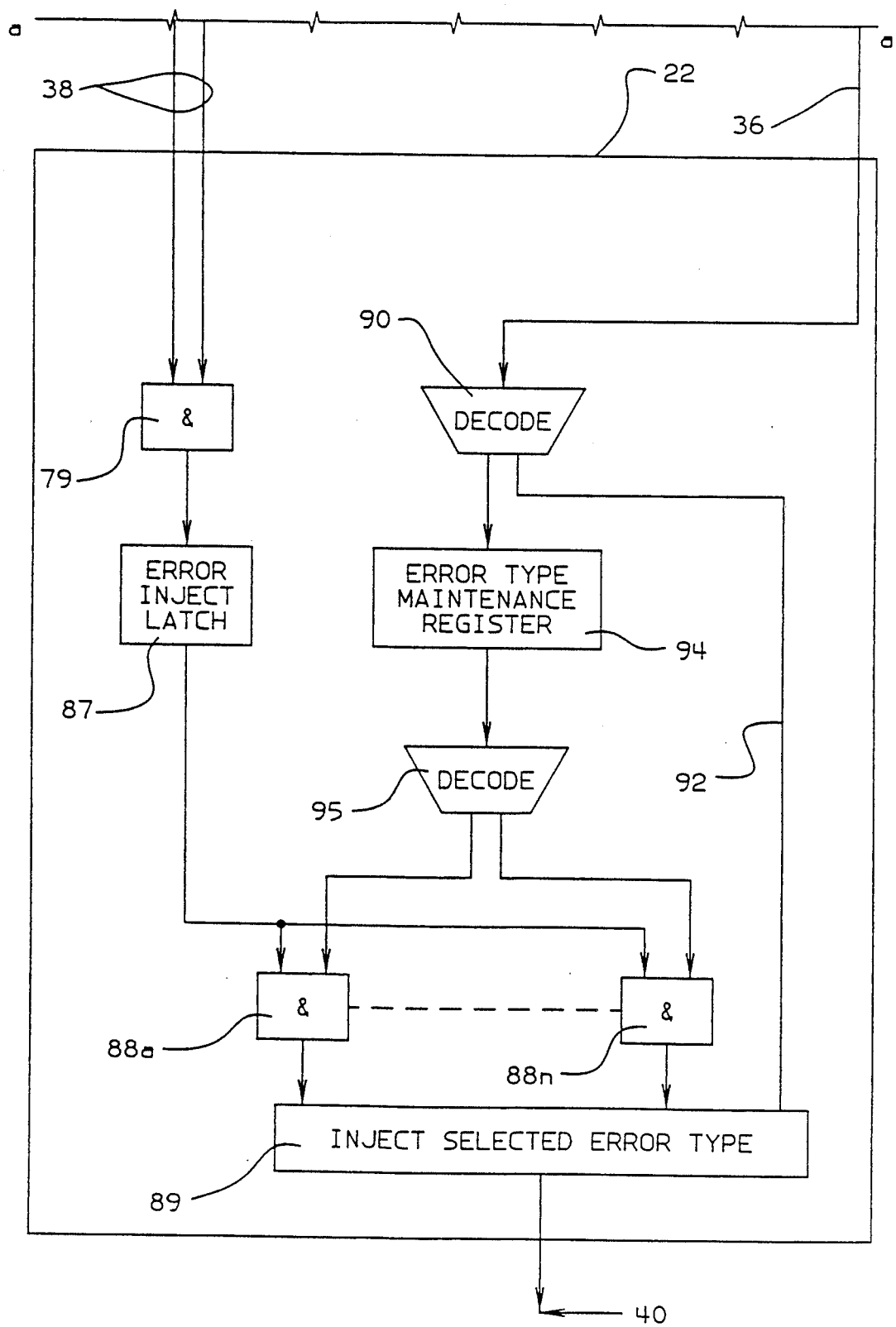

Referring now to FIGS. 3A and 3B, there is shown a block diagram of the contents of the microcode compare hardware 21 and error inject hardware 22 of FIG.

1. The microcode compare hardware includes a selection maintenance register 60, an address compare register 62, and the control store address register 64 (CSAR) of the channel 14. The CSAR 64 is the register which contains the address of the presently executing microcode instruction. As discussed in connection with FIG. 1, the console user interface 16 is connected via bus 23 and input path 30 to the microcode compare hardware 21. The input path 30 includes a decoder 65 which separates selection maintenance register data to be placed on line 66 from address compare register data to be placed on line 67. Selection maintenance register data may also be provided by the error inject microcode 20 via line 32, decoder 70, and line 71 to the selection maintenance register 60. Similarly, address compare register data may be provided by the error inject microcode 20 via line 32, decoder 70, and line 72 to the address compare register 62.

When the address in the address compare register 62 and the CSAR 64 are the same, the compare circuit 75 provides a sync compare signal on line 76 which is connected to one input of the AND gates 78 and 79. A decoder 80 decodes the contents of the selection maintenance register 60, and has outputs 82 and 83 connected to the other inputs of the AND gates 78 and 79, respectively. The output of the AND gate 78 is connected to an address compare sync trap latch 85, whose output 34 provides the microcode interrupt signal mentioned in connection with FIG. 1. It will thus be seen that when the desired address as set in the address compare register 62 is the same as that in the CSAR 64, the AND gates 78 and 79 are each partially enabled by the sync compare signal on 76. The code set in the selection maintenance register 60 may then be selected to generate a set sync microcode trap signal over line 82 to fully enable AND gate 78 and send a microcode interrupt signal over 34, or be selected to generate an arm error inject signal on 83 to fully enable the AND gate 79, or may be selected to fully enable both AND gates 78 and 79 to thereby generate the mentioned arm error inject and interrupt signals.

The AND gate 79 is contained in the error inject hardware 22, and has its output connected to an error inject latch 87. The output of the error inject latch 87 is connected to one input of each of a plurality of AND gates 88a to 88n. The error inject microcode 20 provides error type data over line 36 to a decoder 90. The decoder places either a set direct error signal on line 92 or places the error type data in an error type maintenance register 94, depending on the value of the error type data. The set direct error signal on line 92 means that an error indication is to be returned to the function microcode 18 immediately.

The error types, referred herein as cases, are decoded by a decoder 95 to cause selected errors, as desired, to be injected into the channel 14, as represented at 89, to test error detection and recovery procedures of the functional microcode 18. The hardware inputs of 89 for injecting errors may be to one or more of the main data flow register, the data flow checkers, functional arrays, control arrays, or to a specific data flow path of a logic node. In a specific embodiment, the error injection connections of 89 are provided for the following cases:

Case 1—Set the Storage Interface Register accumulation (SIR) Reg to '00'✕ with bad parity;

Case 2—Set SIR Reg to '00'✕ with bad parity and block the SIR parity checker and all other chip check register indications caused by SIR parity checks (local storage and working storage damage etc.) for 2 cycles;

Case 3—Invert the SIR Reg output parity bit, SIR parity bit to checker not inverted;

Case 4—Invert the SIR Reg output parity bit, SIR parity bit to checker inverted;

Case 5—Force the recovery register to bad parity;

Case 6—Force Operational Out (Opl Out) off (turn on invalid Opl Out);

Case 7—Force Writeable Control Storage parity (WCS P) check to the I/O chip;

Case 8—Turn on diagnostic mode of one cycle in the I/O chip. This forces random errors in the chip check register 4 based on values in the command register and the backup count register.

Case 9—Force WCS P check to the main processor chip;

Case 10—Force WCS decode check;

Case 11—Force microcode detect check and WCS decode check;

Case 12—Unused;

Case 13—Force storage time out check;

Case 14—Force double advance check;

Case 15—Turn on diagnostic mode for one cycle in the engine chip. This forces random errors in the chip check register 3 based on values in the Channel Request Handler (CRH) data register's buffer A and Buffer B.

Case 16—Turn on Bi-Directional (BiDi) channel interface bus sequence error.

Figure 4:
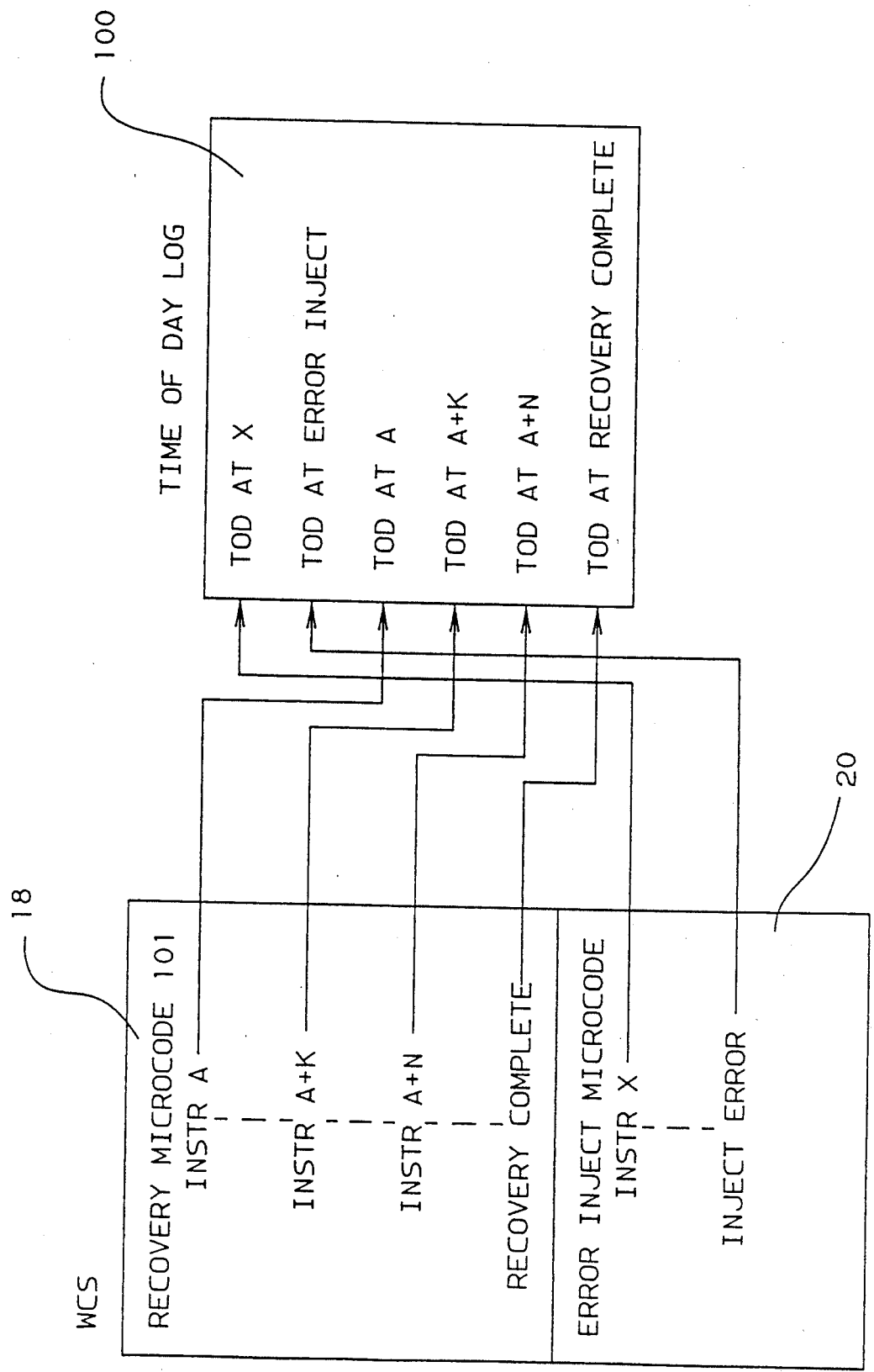
FIG. 4 is an illustration of a time of day log as constructed by microcode of the error injection tool and the channel under test of FIG. 1.

FIG. 4 is a representation of the establishment of a time of day log 100. The functional microcode 18 in the WCS includes recovery microcode 101 which is invoked when errors are injected by the error inject tool of the present invention. The error inject microcode 20 includes an instruction, INSTR X, at or near its beginning which accesses the TOD register 42 (see FIG. 1) and places the time value in an entry in the time of day log 100. A time of day entry may also be entered when the error is injected, shown as the TOD at error inject entry in log 100. After an error is injected, control is transferred back to the functional microcode as shown by line 40 of FIG. 1. At this time, the recovery microcode 101 takes over to effect recovery from the injected error. Various time readings may be taken by the recovery microcode by accessing the TOD register 42 at desired points, and entering the time of day readings in the time of day log 100, as shown in FIG. 4 at INSTR A, INSTR A+K, INSTR A+N, and RECOVERY COMPLETE. By constructing such a time of day log, the exact time that it takes to start and recover from an error is known.

Figure 5:
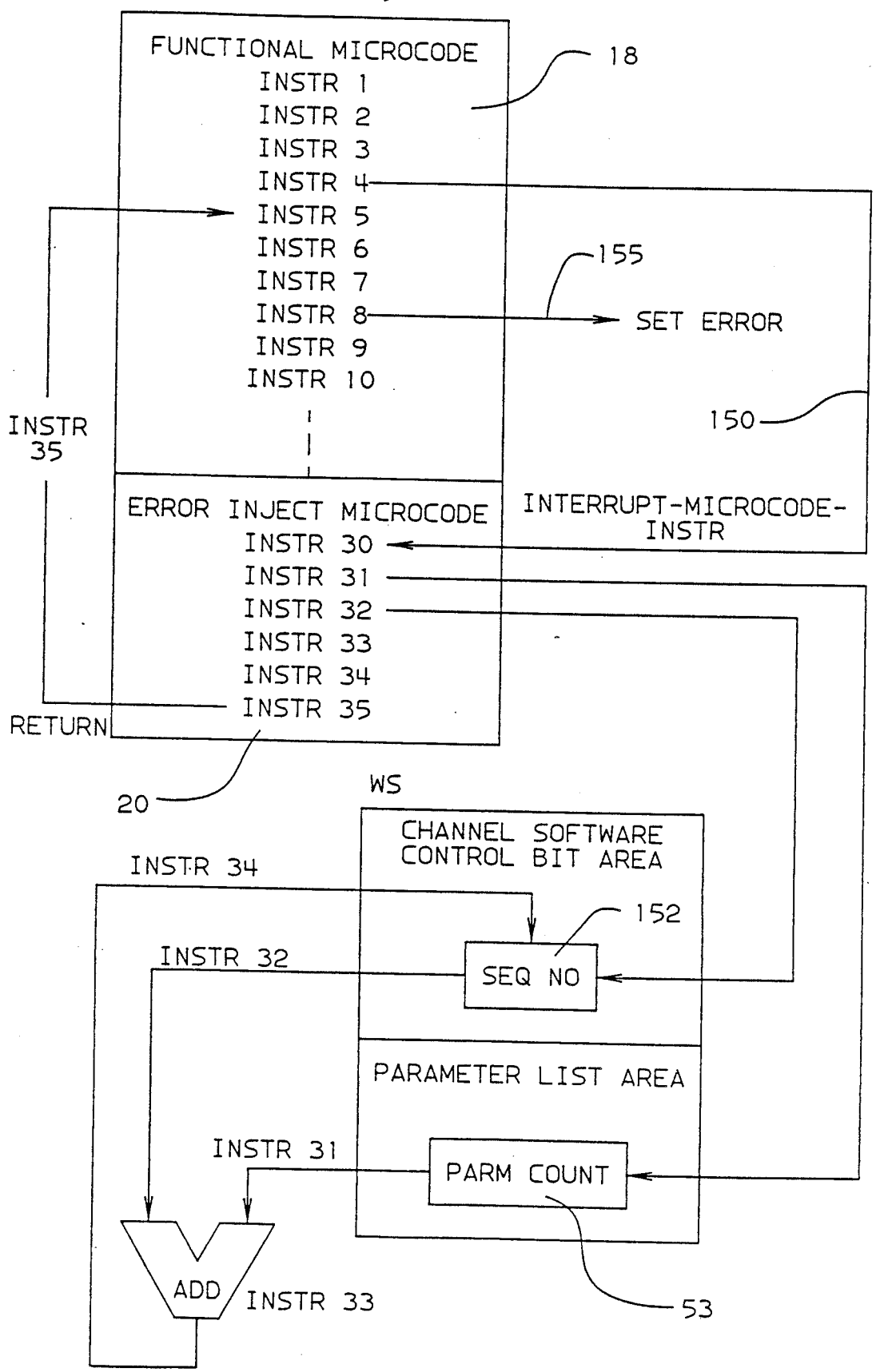
FIG. 5 is an block diagram showing the use of the error injection tool of FIG. 1 wherein a delayed error is injected under microcode control.

FIG. 5 is an illustration of how the error inject tool of the present invention may be used to produce future errors when the functional microcode 18 discovers an error previously set up by the error inject microcode 20. As is well understood, the functional microcode 18, during the operation of the channel 14, stores software control bits in an array (not shown) to determine and to create checkpoints for keeping track of the functional location of the functional microcode 18 and the hardware (not shown), as they perform various channel operations. These control bits are fetched by microcode from an array as a part of normal execution of the channel operation, and are tested, updated and checked as appropriate for the function being performed. Microcode continually checks for the correct values of the software control bits, and will, upon detection of an incorrect value, set an error condition to indicate that the microcode and hardware are not performing the correct intended function.

In FIG. 5, the software control bits are manipulated to cause the functional microcode 18 to detect error conditions based on the detection of incorrect values for the function being performed. In FIG. 5, the functional microcode 18, for example, may contain the routine of Table I.

TABLE I

| Instruction Value | CSAR Value | Description |
| --- | --- | --- |
| INSTR 1 | 1 | Fetch SEQ NO from WS |
| INSTR 2 | 2 | Set SEQ NO fetched to 2 |
| INSTR 3 | 3 | Store updated SEQ NO in WS |
| INSTR 4 | 4 | Typical instruction |
| INSTR 5 | 5 | Typical instruction |
| INSTR 6 | 6 | Fetch SEQ NO from WS |
| INSTR 7 | 7 | Test if SEQ NO is 2 IF SEQ NO is 2 GO TO INSTR 9 ELSE GO TO INSTR 8 |
| INSTR 8 | 8 | Set error condition and stop |
| INSTR 9 | 9 | Add +1 to SEQ NO |
| INSTR 10 | 10 | Continue |

The error inject microcode 20, for example, may contain the routine of Table II.

TABLE II

| Instruction Number | CSAR Value | Description |
| --- | --- | --- |
| INSTR 30 | 30 | Fetch parameter list from WS |
| INSTR 31 | 31 | Select PARM COUNT field |
| INSTR 32 | 32 | Fetch SEQ NO from WS |
| INSTR 33 | 33 | Add PARM COUNT to SEQ NO |
| INSTR 34 | 34 | Store new SEQ NO back into WS |
| INSTR 35 | 35 | Return to functional microcode 18 |

In order to set up the delayed error injection of FIG. 5, the value of "4" is placed into the address compare register 62 of FIG. 3. A value is set in the selection maintenance register 60 which will enable the AND gate 78 but which will not enable the AND gate 79. The functional microcode 18 will execute INSTR 1- INSTR 4, which will set the value in the SEQ NO register 152 to "2". When the value "4" is in the CSAR 64 during the execution of the microcode routine of FIG. 5 (see Table I), there will be an equal compare at 75, and the AND gate 78 will be enabled to set the address compare sync trap on 85, thereby generating an interrupt at 34. This interrupt will enter the error inject microcode 20 at INSTR 30, as shown at 150. The instructions INSTR 31-INSTR 34 of Table II will fetch the PARM COUNT value from the current parameter list entry 53, will add this value to the value in SEQ NO 152, and will store the result back in SEQ NO 152. INSTR 35 of the error inject microcode 20 will then execute a return to the functional microcode 18, which will return to INSTR 5. In this way, the value in the SEQ NO register 152 is changed to an incorrect value, and the functional microcode will go to instruction INSTR 8 rather than INSTR 9. As a result of INSTR 8, an error is set at 155.

The set direct error function of the error inject hardware 22 may be used, for instance, to detect a logic branch taken. In this case instructions may be added at the appropriate point of a routine of the error inject microcode 20 to increment the pointer for the parameter list 53 to a new entry previously established with the code for a set direct error in its error type field. The value in the address compare register 62 and the selection maintenance register 60 is then set to cause an interrupt when a particular logic branch is taken. When the CSAR 64 reaches the branch address, an interrupt is generated on 34 as previously described. the next entry of the parameter list 53 is fetched, and an immediate error is generated on line 92 of FIG. 3 in response to the set direct error code in the error type field.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. In a computer system having a channel, microcode means for controlling the channel by executing a sequence of microcode instructions, and a console interface, an error injection tool comprising:
   input means communicating between said channel and said console interface for inputting at least one parameter;
   error inject means in said channel for dynamically instructing said microcode means to inject a specified error into said channel at a selected microcode instruction responsive to one or more parameters from said console interface; and
   timing means for measuring the time of said computer system to recover from the error injected responsive to said microcode means.

2. The error injection tool of claim 1, wherein said timing means comprises a time of day log having an entry for storing the time of day when said error is injected into said channel, and an entry for storing the time of day when said channel complete recovery from said error injected into said channel.

3. The error injection tool of claim 1 wherein said error inject means includes an address compare register connected to said input means for receiving an address of a selected instruction in said sequence of microcode instructions when said specified error is to be injected, and an error type register connected to said input means for receiving an indication of the type of error to be injected.

4. The error injection tool of claim 3 wherein said error inject means further comprises a selection maintenance register connected to said input means for receiving a code for controlling the injection of said error into said channel.

5. The error injection tool of claim 4 further comprising error arming means connected between said error type register and said selection maintenance register, said error arming means which, when enabled, arms the injection of said error into said channel.

6. The error injection tool of claim 5 wherein said error arming means includes AND means connected to said address compare register and said selection maintenance register, said AND means for enabling said error arming means by the address in said address compare register and the code in said selection maintenance register.

7. The error injection tool of claim 6 further comprising storage means for storing a list of entries, each entry of said list containing said parameters for injecting an error into said channel.

8. The error injection tool of claim 7 further comprising decode means between said input means, said storage means, and said error inject means for selecting data from either of said console interface or a list entry in said storage means, said selected data for being input into at least one of said address compare register, said selection maintenance register and said error type register.

9. The error injection tool of claim 8 wherein said error inject means includes interrupt signal generating means connected between said selection maintenance register and said address compare register, said interrupt signal generating means for generating an interrupt signal responsive to the code in said selection maintenance register and the address in said address compare register.

10. The error injection tool of claim 9 further comprising microcode in said microcode means for loading, in response to an interrupt signal generated by said interrupt signal generating means, new data into at least one of said address compare register, said selection maintenance register and said error type register from an entry of parameters in said list in said storage means.

11. An error injection tool for use in a computer system having working storage for storing control bits, addressable instruction storage for storing microcode instructions, and a microcode controlled device whose function is controlled by the control bits in said working storage, said microcode controlled device having a microcode instruction executing means for executing microcode instructions stored in a set sequence of addresses in said microcode instruction storage, said error injection tool comprising:
  address compare means for comparing a selected address with the address of a microcode instruction currently being executed;
  interrupt signal generating means for generating an interrupt signal responsive to an equal compare by said address compare means;
  a microcode routine for altering said control bits stored in said working storage responsive to said generated interrupt signal for injecting a delayed error, which delayed error is not injected until the use of said altered control bit by the execution of a subsequent microcode instruction at a later time;
  execution control means for transferring the execution of said microcode executing means to said microcode routine responsive to said interrupt signal; and
  return means in said microcode routine for returning the execution of said microcode executing means to a microcode instruction at the address following said selected address in said set sequence of addresses such that the effect of the altered control bits on the microcode controlled device may be observed.

12. In a computer system having a channel, microcode means for controlling the channel, and a console interface, an error injection tool comprising:
  input means communicating between said channel and said console interface for inputting at least one parameter;
  storage means connected to said input means for storing parameters from said input means in a list having entries of parameters; and
  error inject means in said channel for dynamically instructing said microcode means to inject a specified error into said channel responsive to one or more parameters from either said console interface or an entry of parameters in said storage means.

13. The error injection tool of claim 12 further comprising timing means for measuring the time of said computer system to recover from the error injected responsive to said microcode means.

14. The error injection tool of claim 13 wherein said timing means comprises a time of day log having an entry for storing the time of day when said error is injected into said channel, and an entry for storing the time of day when said channel completes recovery from said error injected into said channel.

15. The error injection tool of claim 12 wherein said microcode means includes instruction storage means for storing a program of microcode instructions and execution means for executing said microcode instructions in a preselected sequence, and wherein said error inject means includes an address compare register connected to said input means for receiving an address of a microcode instruction in said program stored in said instruction storing means at which, when executed, said specified error is to be injected, and an error type register connected to said input means for receiving an indication of the type of error to be injected.

16. The error injection tool of claim 15 wherein said error inject means further comprises a selection maintenance register connected to said input means for receiving a code for controlling the injection of said error into said channel.

17. The error injection tool of claim 16 further comprising error arming means connected between said error type register and said selection maintenance register, said error arming means which, when enabled, arms the injection of said error into said channel.

18. The error injection tool of claim 17 wherein said error arming means includes AND means connected to said address compare register and said selection maintenance register, said AND means for enabling said error arming means by the address in said address compare register and the code in said selection maintenance register.

19. The error injection tool of claim 18 further comprising decode means between said input means, said storage means, and said error inject means for selecting data from either of said console interface or a list entry in said storage means, said selected data for being input into at least one of said address compare register, said selection maintenance register and said error type register.

20. The error injection tool of claim 19 wherein said error inject means includes interrupt signal generating means connected between said selection maintenance register and said address compare register, said interrupt signal generating means for generating an interrupt signal responsive to the code in said selection maintenance register and the address in said address compare register.

21. The error injection tool of claim 20 further comprising microcode in said microcode means for loading, in response to an interrupt signal generated by said interrupt signal generating means, new data into at least one of said address compare register, said selection maintenance register and said error type register from an entry of parameters in said list in said storage means.

22. An error injection tool for use in a computer system having working storage for storing control bits, addressable instruction storage for storing a functional program having a selected sequence of microcode instructions, and a microcode controlled device having a microcode instruction executing means for executing instructions from said functional program thereby controlling said microcode controlled device as specified by said control bits, said error injection tool comprising:

a set of parameters in said working storage for controlling the injection of errors into the computer system;

error inject hardware means for injecting an immediate error into said computer system responsive to parameters in said set of parameters;

an error inject microcode routine for execution by said microcode instruction executing means to thereby inject a delayed error into said computer system by altering one or more of said control bits;

instruction address compare means for comparing the address of the instruction being executed by said microcode instruction executing means with a selected address for determining when to inject an error; and logic means responsive to at least one parameter in said set of parameters for selecting at least one of said error inject hardware means and said error inject microcode routine such that at least one of an immediate error and a delayed error is injected into said computer system.

* * * * *